US008752164B2

(12) United States Patent
Dubovsky et al.

(10) Patent No.: US 8,752,164 B2
(45) Date of Patent: Jun. 10, 2014

(54) LANGUAGE INDEPENDENT LOGIN

(75) Inventors: Oded Dubovsky, Haifa (IL); Itzhack Goldberg, Hadera (IL); Ido Levy, Kiryat Mozkin (IL); Ilan Shimony, Haifa (IL); Grant D. Williamson, Hazerswoude Dorp (NL)

(73) Assignee: International Business Machines Corporation, Armonk, NY (US)

(*) Notice: Subject to any disclaimer, the term of this patent is extended or adjusted under 35 U.S.C. 154(b) by 1462 days.

(21) Appl. No.: 12/126,905

(22) Filed: May 25, 2008

(65) Prior Publication Data

US 2009/0178135 A1    Jul. 9, 2009

(30) Foreign Application Priority Data

Jun. 8, 2007    (EP) .................................... 07109916

(51) Int. Cl.
    *H04L 29/06*    (2006.01)
(52) U.S. Cl.
    USPC ................................... 726/18; 726/5; 380/29
(58) Field of Classification Search
    CPC ................................ G06F 21/31; H04L 63/08
    USPC ............................................................. 726/18
    See application file for complete search history.

(56) References Cited

U.S. PATENT DOCUMENTS

| 5,062,060 | A | * | 10/1991 | Kolnick | 715/800 |
| 5,261,079 | A | * | 11/1993 | Celi, Jr. | 703/24 |
| 5,581,484 | A | * | 12/1996 | Prince | 702/150 |
| 6,980,081 | B2 | | 12/2005 | Anderson | |
| 7,705,829 | B1 | * | 4/2010 | Plotnikov | 345/168 |
| 8,059,015 | B2 | * | 11/2011 | Hua et al. | 341/33 |
| 2002/0021287 | A1 | * | 2/2002 | Tomasi et al. | 345/168 |
| 2004/0073809 | A1 | | 4/2004 | Keong | |
| 2004/0123151 | A1 | * | 6/2004 | Mizrah | 713/201 |
| 2004/0133778 | A1 | * | 7/2004 | Madani | 713/168 |
| 2005/0160297 | A1 | | 7/2005 | Ogawa | |
| 2007/0089070 | A1 | * | 4/2007 | Jaczyk | 715/816 |
| 2007/0089164 | A1 | * | 4/2007 | Gao et al. | 726/4 |

FOREIGN PATENT DOCUMENTS

EP    1 434 408 A2    6/2004

* cited by examiner

*Primary Examiner* — Mohammad L Rahman
(74) *Attorney, Agent, or Firm* — Hoffman Warnick LLC

(57) ABSTRACT

The present invention prevents illegitimate access to a user computing machine. A method in accordance with an embodiment includes: setting an authentication routine in the user computing machine; generating a virtual keyboard on the user computing machine; entering a user identification through the virtual keyboard, the user identification being entered according to a virtual keyboard form factor; comparing the entered user identification with a secure user identification previously stored in the user computing machine; and validating the user access to the user computing machine if a match occurs, otherwise denying access.

15 Claims, 5 Drawing Sheets

LANGUAGE INDEPENDENT LOGIN

TECHNICAL FIELD

The present invention relates to the field of user authentication, and more particularly to a system and method to strengthen the confidentiality of user authentication when logging on to various system infrastructures.

BACKGROUND OF THE INVENTION

Different methods to safeguard a user's personal identity when logging in on a machine such as a computer system are well-known.

Some of these methods use biometrics or voice recognition technology or other recognition methods. A common characteristic of those methods is to apply intrusive procedures to the user such as submitting to fingerprinting or having his/her face or iris scanned. Whereas such technologies offer a robust identification mechanism, the incorporation of recognition sensors within existing machines can be a fastidious operation.

Moreover, these technologies still require a physical keyboard as a primary means to access a system network via personal authentication information such as a password.

The password generally consists of a code, typically an alphanumeric combination, which is uniquely associated with a user. The password is the confidential authentication information to be exploited by a verification system that checks the identity claimed.

Each time a user logs on to a computer, he/she enters his/her password via the physical keyboard. Keyboard layouts are different from one region to another, as some keyboards contain may 101 keys (e.g., for US zones) while others may have 102 keys (e.g., for French zones) or 112 keys (e.g., for Japan zones). Most keyboard layouts are AZERTY or QWERTY, while others are QWERTZ or can be completely different, like a Dvorak keyboard.

The keyboard layout is generally defined by an "Input Locale" which is a combination of an input language with an input method. Specifically the Input Locale describes the language being entered and how it is being entered. Moreover the keyboard layout is set by using regional and language options, like "glyph characters", even if the basic keypad still reflects the "Latin character" layout.

In today's world, the use of the "Latin character" keyboard layout is the common way to gain access to a system for legitimate users. Whereas everyone is familiar with such a standard keyboard layout, it becomes easy to eavesdrop on a user when the user enters a password when logging on.

Moreover, the new trend of working conditions creates workplaces completely barrier-free with no partitions separating workstations. In such open-space structures, any attacker can easily exploit the open-space security weaknesses by illegitimately observing (e.g., over the shoulder) the password a legitimate user is entering.

This technique of password eavesdropping can be extremely effective to gain unauthorized access to a system, particularly, when people or individuals are located in a workplace, such as an open-space.

Whereas some of the existing password protection portals can be safe against fraudulent use, they are still exposed to security risks.

SUMMARY OF THE INVENTION

The present invention provides a safe and secure user identification method and system.

The present invention provides a language-independent user interface for: achieving a user recognition method; safely typing confidential authentication information of a legitimate user; registering the same; and authenticating the legitimate user when logging on.

The present invention further provides a user with a symbolic representation that is extremely effective against shoulder surfing or any other illegitimate observing.

The present invention further provides a safer and more secure user identification system, which can be easily incorporated in existing infrastructures, which is fully system platform independent, and which satisfies security directives when the user is logging on in barrier-free workplaces.

According to an aspect of the present invention, there is provided a method for preventing illegitimate access to a user computing machine, comprising: setting an authentication routine in the user computing machine; generating a virtual keyboard on the user computing machine; entering a user identification through the virtual keyboard, the user identification being entered according to a virtual keyboard form factor; comparing the entered user identification with a secure user identification previously stored in the user computing machine; and validating the user access to the user computing machine if a match occurs, otherwise denying access.

Further aspects of the invention will now be described, by way of illustrative implementation and examples, with reference to the accompanying figures.

BRIEF DESCRIPTION OF THE DRAWINGS

The above and other items, features and advantages of the invention will be better understood by reading the following more particular description of the invention in conjunction with the accompanying drawings.

DETAILED DESCRIPTION OF THE INVENTION

Figure 1:
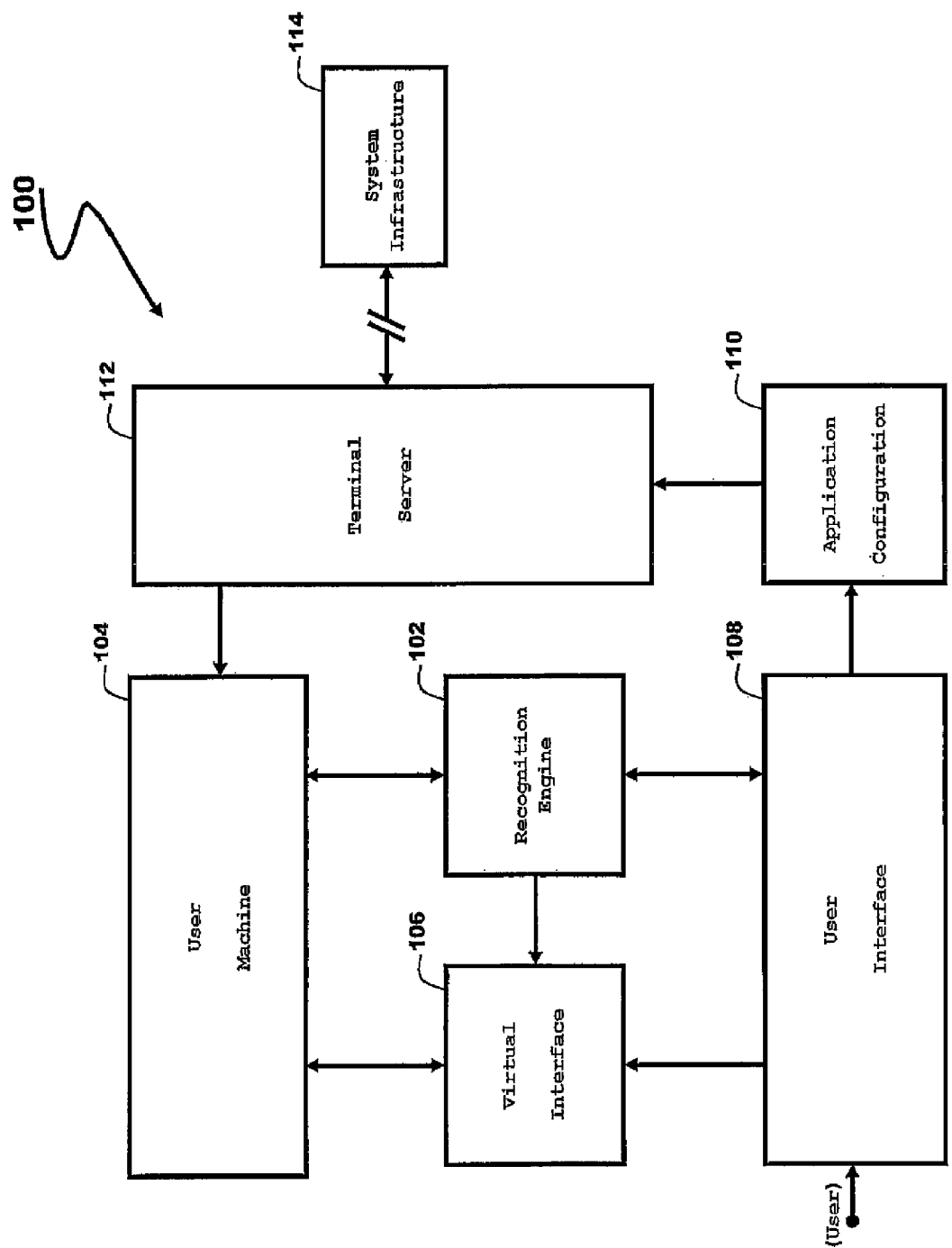
FIG. 1 shows a block diagram of an illustrative implementation of the present invention.

Embodiments of the invention are described below by way of examples with reference to the accompanying figures and drawings.

More specifically, according to a first aspect, the present invention provides a user recognition method and a system allowing for robust authentication of a legitimate user. A computer server provides to a user, a language-independent interface, hereafter referred to as a "virtual keyboard", which allows a user to enter through a symbolic representation his/her authentication information. The virtual keyboard appears on the screen of the user machine, which may comprise a workstation or any individual equivalent computer system.

Embodiments of the present invention utilize a symbolic representation of the confidential authentication information that is based on the representation of the relative key position instead of the exact meaning of the character of the key. As such, the elements of the authentication information are defined by their relative location on the virtual keyboard. Each element is referenced by two parameters in the virtual keyboard: a row position it should reside on and a column position that intersects the given row.

In the present invention, the aforementioned symbolic representation of the authentication information combines a mathematical formula with a predefined sequence of the location of the keys on the virtual keyboard. The mathematical formula provides the user with the row to be selected while the predefined sequence locates the adequate column on the selected row. The predefined sequence is provided by establishing a key selection sequence. It may be defined by the legitimate user for later use, or may be defined by a system administrator or other authorized person.

The key selection sequence may be created by assigning a position to a key in an easy-to-remember mnemonic sequence. The use of a mnemonic sequence allows the user to easily remember the data attached to his/her ego and thus to easily recall his/her mnemonic sequence. However, the sequence may be any other complex combination that the user may safeguard.

The virtual keyboard comprises a variable key array matrix (rows and columns) arrangement. The form factor and the size of the variable key array matrix are initially defined when the user or a system administrator configures the system environment.

It is to be noted that the present invention may be used to generate a matrix for which the form factor outline is not restricted to a rectangular shape, as it will be further detailed with reference to FIG. 5. The system can generate a polygonal shape for which rows and columns are shifted as shown in FIGS. 5A and 5B. Thus, the virtual keyboard arrangement differs from the physical keyboard layout.

It should be also noted that the virtual keyboard is language-independent and the predefined selection of the keys does not care what is engraved on the top of the keys. The top-keys can be either blank or randomly engraved because the mnemonics selection uses the relative position of the keys located on the virtual keyboard instead of the "Latin character" or "glyph character" representation of these keys if they exist.

Referring now to FIG. 1, there is depicted a block diagram of an illustrative implementation of a system (100) of the invention. The system (100) comprises a recognition engine (102), a user machine (104), and a terminal server (112). The terminal server (112) is coupled to the user machine (104), and can also interface with a system infrastructure (114), such as LAN, WAN and/or the Internet.

An application configuration block (110) provides a user (shown as an arrow 'user') through a user interface (108) with the flexibility to enable or disable the recognition engine (102). When setting out, the application allows a legitimate user to enter his/her confidential authentication information through a virtual interface (106). The virtual interface (106) comprises a virtual keyboard (not shown here) that is displayed on the screen of the user machine (104), allowing the legitimate user to enter his/her confidential authentication information. The configuration of the application is an initial step to initialize, enable, and/or disable the functionalities of the invention.

Figure 2:
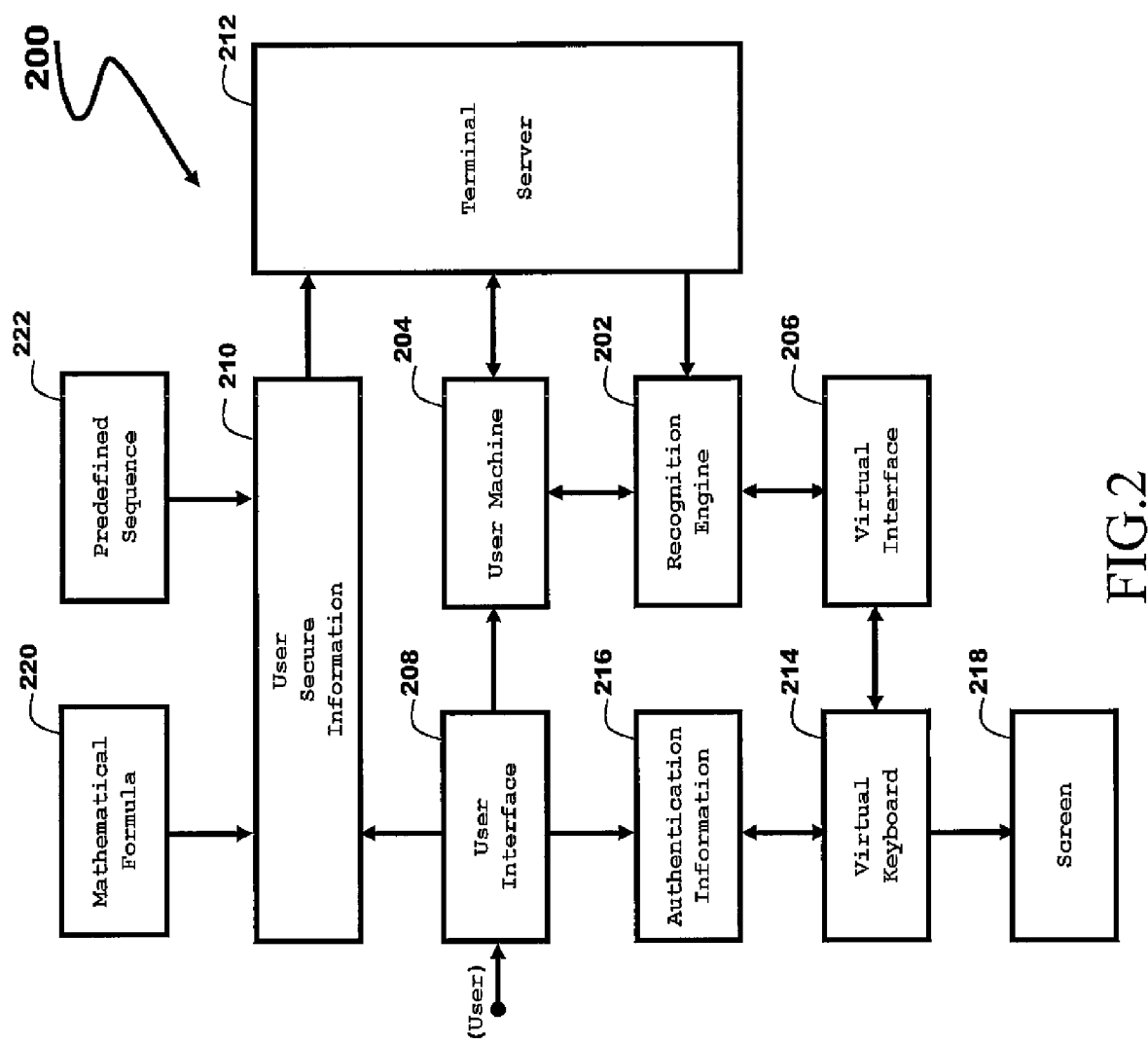
FIG. 2 is a functional diagram of the system of FIG. 1.

FIG. 2 details in operation the system of FIG. 1. The terminal server (212) enables the user machine (204) to authenticate a user ('user'). The user interface (208) allows the user to interface with the user machine (204). As already explained with reference to FIG. 1, the user secure information (210) is predefined by the user during the configuration of the application such that it is available on the terminal server (212). As such, when operating the authentication routine, the user secure information (210) is used by the recognition engine (202). When a user logs on, the recognition engine (202) initiates the virtual interface (206) and presents to the user a virtual keyboard on a screen (218). The user then enters the adequate authentication information (216) to be identified by the terminal server (212) to validate the access connection.

As detailed above, the form factor of the virtual keyboard differs from one user to another. Further, the form factor of the virtual keyboard differs from one system to another. These differences provide the system with better protection against an eavesdropping attack or illegitimate observing. In operation, the recognition engine (202) unloads the user secure information (210) that is stored in the terminal server (212). Then, the user secure information (210) is transmitted to the virtual interface (206) to generate a virtual keyboard (214) accordingly. The user secure information is an association of a mathematical formula (220) and a predefined sequence (222). This symbolic representation allows the user to select the appropriate keys on the virtual keyboard (214). By using the virtual keyboard the user applies his/her authentication information (216) to be identified as a legitimate user. The authentication information (216) is presented to the recognition engine (202) via the virtual interface (206). Then, the recognition engine (202) compares the user secure information coming from the terminal server (212) with the authentication information of the user. A hit comparison means that a legitimate user has been identified to gain access to the user machine. Thus, the recognition process comprises an initialization phase to configure the application and then a recognition phase each time a user logs on the machine.

Figure 3:
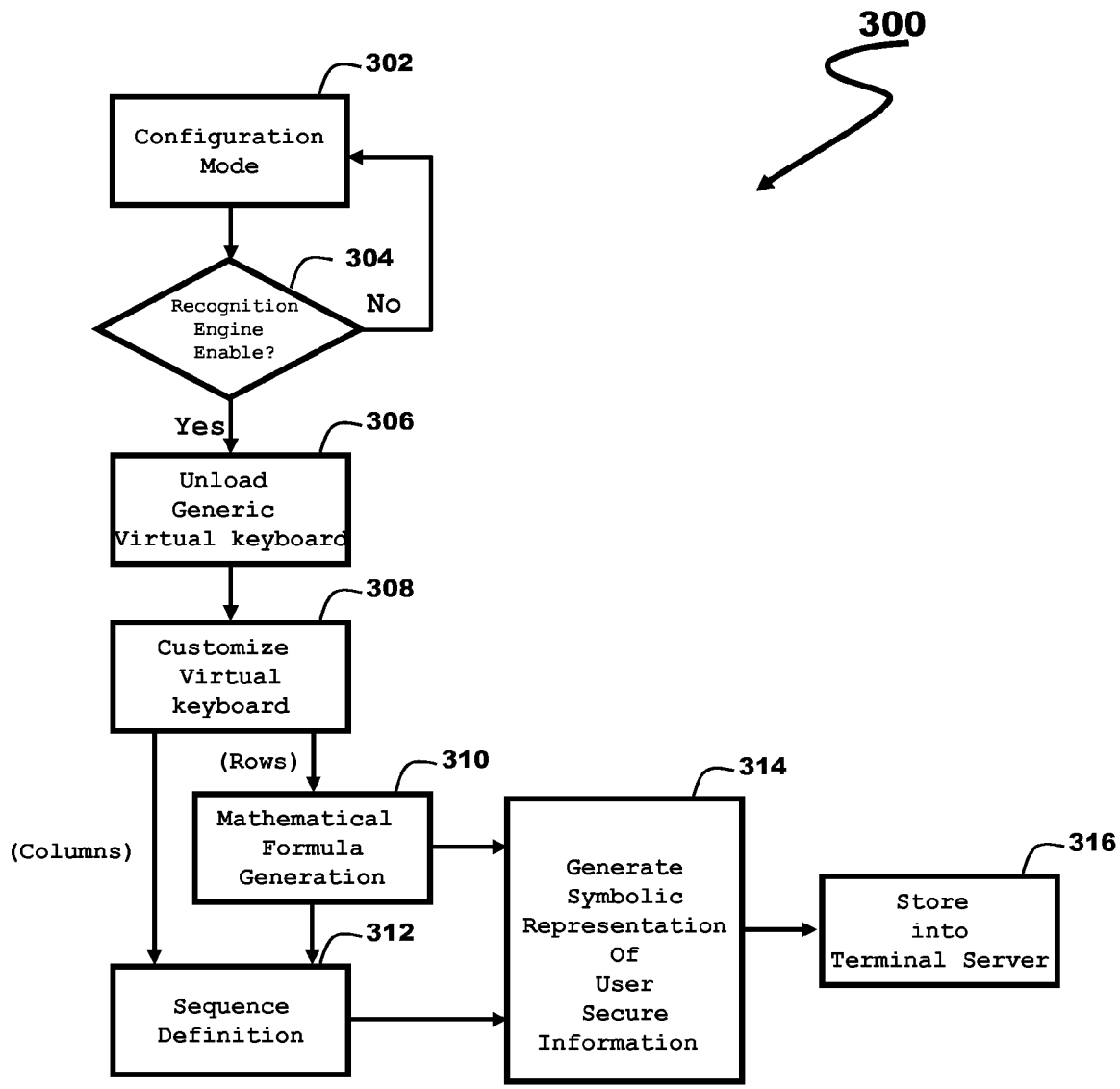
FIG. 3 shows the configuration operations when configuring a portal, a workstation, a terminal server, or any computer equivalent system.

A flow chart representing an illustrative recognition process (300) when configuring the application is now described with reference to FIG. 3. The configuration of the application allows the user to customize the symbolic representation of the authentication information to be used later when logging on.

The configuration of the application includes creating a symbolic representation of the user password. A series of actions determines the configuration of the application the user wants to customize, as described below.

At 302, the user initiates the configuration mode of the application in order to selectively enable the recognition engine.

At 304, the terminal server checks the configuration of the application. If the user enables the application (Branch Yes) the terminal server unloads a generic virtual keyboard (306) to be customized (308) by the user. If the user disables the application (Branch No) the application is inactive.

At 306, the generic virtual keyboard is displayed to the user via the screen of the machine. The generic virtual keyboard is customized at 308. The virtual keyboard comprises a variable array (rows and columns) matrix. The size and the form factor are defined by the user or by the system administrator and can be different from the current machine physical keyboard layout.

At 308, the user customizes his/her virtual keyboard configuration. First, a mathematical formula corresponding to the virtual keyboard array matrix in terms of rows is generated (310). Second the user defines a key sequence (step 312) corresponding to his/her user secure information in terms of the virtual key position in columns. Each key position in a column is to be aligned with the rows preliminary generated by the mathematical formula in 310.

At 314, the symbolic representation of the user secure information is generated combining the mathematical formula (step 310) with the predefined sequence (step 312).

At 316, the symbolic representation is stored in the terminal server for later retrieval when the user logs on to another workplace.

It is to be noted that the storage of the symbolic representation can be done in various data recording medium, such as CDs or USB keys or equivalent. Those skilled in the art will perceive numerous possibilities to extend the storage of the symbolic representation. Such possibilities within the skill of the art are intended to be covered by the appended claims.

Figure 4:
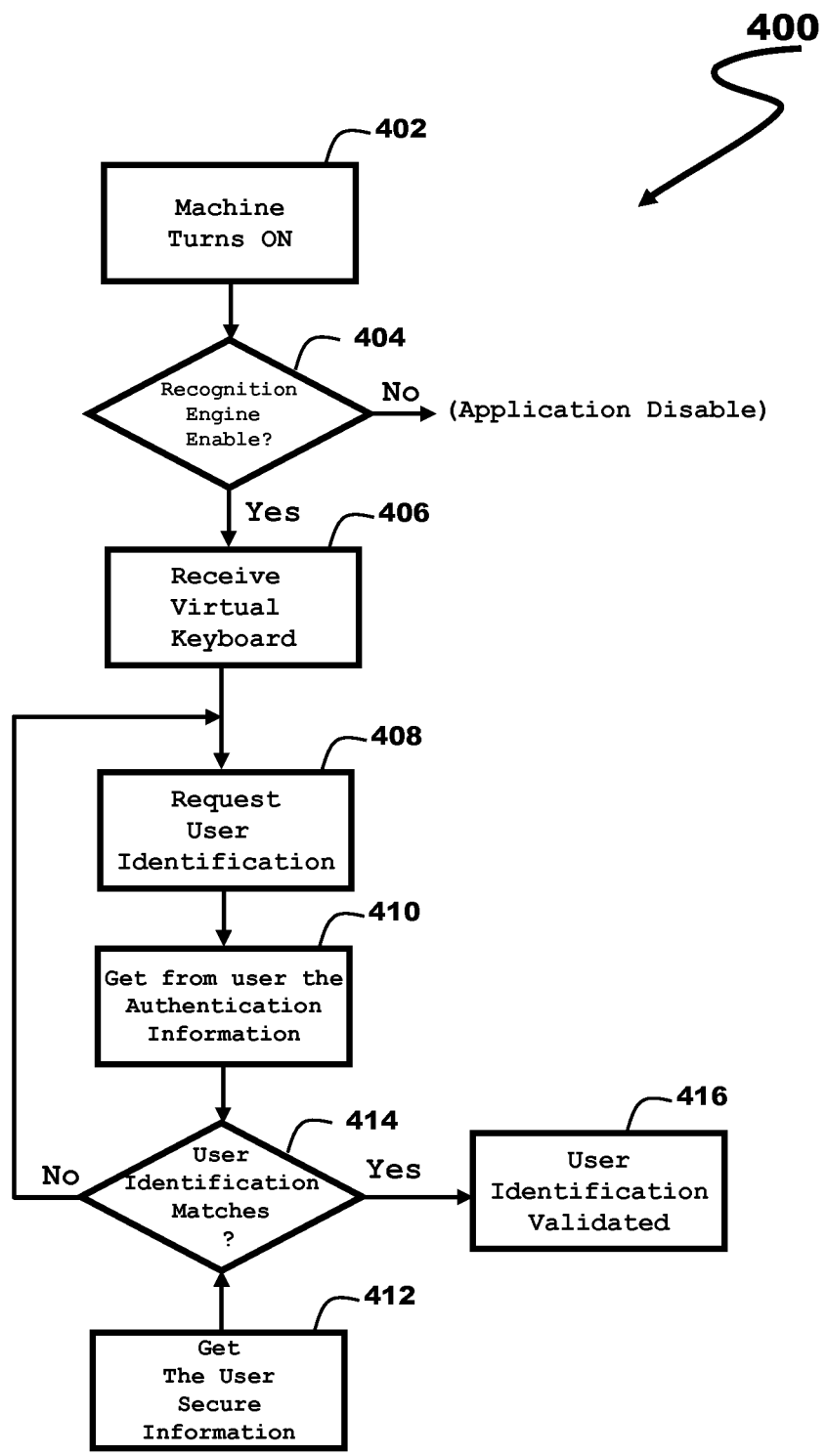
FIG. 4 shows the authentication operations when a user logs on to access a workstation, a terminal server, or any equivalent computer system.

Referring now to FIG. 4, a flow chart of an illustrative recognition process (400) when a user logs on a machine is now described.

At 402, the user turns on a machine. The terminal server enables or disables the recognition engine according to the user initialization. The state of the recognition engine is used at 404.

At 404, a comparison is made to check the state of the recognition engine. If the recognition engine is enabled then the process proceeds to 406 otherwise the application is disabled and the user machine does not care about the recognition engine.

At 406, the user machine receives a virtual keyboard from the terminal server. In an embodiment, the generation of the virtual keyboard may be a random generation. When displayed on a display of the user machine, the random virtual keyboard layout can have a different representation from the one that was preliminary created during the configuration of the application.

At 408, the user requests to the terminal server for a user identification.

At 410, the user enters his/her authentication information by applying both the mathematical formula and the predefined sequence. The mathematical formula indicates which rows belonging to virtual keyboard are to be selected by the user. The predefined sequence is applied to the keys that are located on the adequate columns corresponding to the adequate rows. The selection of the adequate keys may be made using the mouse or the scroll keys or any key typed on the physical keyboard (or using any other suitable selection methodology).

At 412, the user machine obtains the user secure information from the terminal server corresponding to the user who is logging on. As previously detailed, the user secure information is created during the configuration of the application. The user secure information is compared at 414 to the authentication information the user applies to the virtual keyboard.

At 414, a comparison is made to check the user secure information coming from the terminal server with the authentication information entered by the user. If a match comparison occurs (branch Yes of 414) then the recognition process accepts the user as a legitimate user and validates the access to the terminal server at 416. In the other case (branch NO of 414) there is no matching between the user secure information and the authentication information and the user is asked to enter his/her identification again at 408.

At 416, the recognition method validates the user requested terminal server access.

Figure 5:
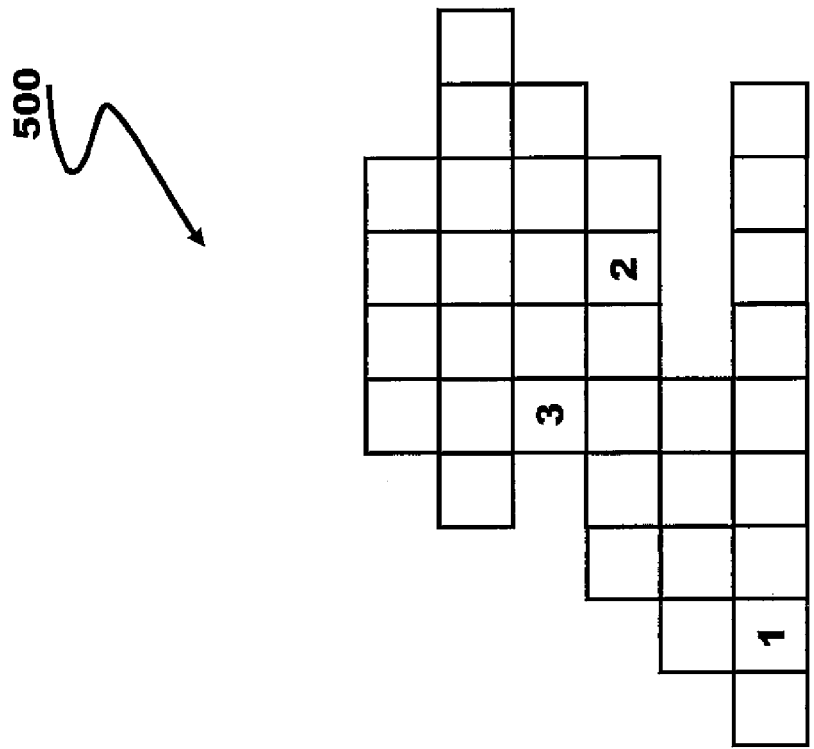
FIGS. 5A and 5B exemplify, on two keyboard layouts, an authentication pattern.
Figure 5:
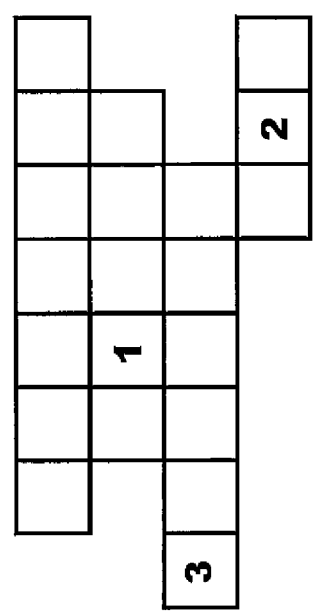

In FIG. 5, the symbolic representation of a user secure information is illustrated by two examples 5A and 5B on two virtual keyboard layouts.

As explained above, the mathematical formula considers the row position of the relative key position, while the predefined selection allows selecting the adequate key, in a preferred column. The row position (RP) is defined as the character (Ch) that is initially provided modulo (%) the number of rows (NbR) available in the virtual keyboard plus "1".

$RP=(Ch \% NbR)+1$; with % meaning modulo.

The predefined selection defines the adequate key to be selected on the column that intersects the row. The selection of the adequate keys can be expressed like the following sequence:

the second from the right; or the middle one; or any formula that allows for various line length (i.e., a relative description instead of a fixed one).

Assuming, for example, the authentication information of the user is three characters in length (e.g., "532"). The user defines his/her own predefined sequence that respectively allocates the position of the adequate key corresponding to each of the three characters as:

the second location from the left, corresponding to the first character (5);

the second location from the right, corresponding to the second character (3);

the first location from the left, corresponding to the third character (2).

Example 5A depicts the aforementioned example where a matrix of four rows (NbR=4) and a random number of columns represents the virtual keyboard that is displayed to the user.

Based on the mathematical formula $RP=(Ch \% NbR)+1$ and the predefined sequence, as defined above, the correct sequence is:

Key position corresponding to the first character '5' is: $RP=(5\% 4)+1=2$ in the second location from the left;

Key position corresponding to the second character '3' is: $RP=(3\% 4)+1=4$ in the second location from the right; and Key position corresponding to the third character '2' is: $RP=(2\% 4)+1=3$ in the first location from the left.

FIG. 5B illustrates for the aforementioned example a matrix of six rows (NbR=6) and a random number of columns representing the virtual keyboard displayed to the user.

Based on the mathematical formula $RP=(Ch \% NbR)+1$ and the mnemonics sequence, as defined above, the correct sequence is:

Key position corresponding to the first character '5' is: $RP=(5\% 6)+1=6$ in the second location from the left.

Key position corresponding to the second character '3' is: $RP=(3\% 6)+1=4$ in the second location from the right.

Key position corresponding to the third character '2' is: $RP=(2\% 6)+1=3$ in the first location from the left.

It should be appreciated that while the invention has been particularly shown and described with reference to a various embodiment(s), changes in form and detail may be made therein without departing from the spirit, and scope of the invention.

The invention claimed is:

1. A method for preventing illegitimate access to a user computing machine comprising:

setting an authentication routine in the user computing machine;

generating a virtual keyboard on the user computing machine;

entering a user identification through the virtual keyboard, the user identification being entered according to a virtual keyboard form factor;

comparing the entered user identification with a secure user identification previously stored in the user computing machine; and validating the user access to the user computing machine if a match occurs, otherwise denying access;

wherein the secure user identification is produced using a computation of a mathematical formula combined with a predefined sequence of a location of keys on the virtual keyboard, the mathematical formula indicating which row positions (RP) on the virtual keyboard are to be selected by the user, wherein the mathematical formula is based on a character (CH) and a number of rows (NbR) available on the virtual keyboard, wherein each selected row position (RP) is given by: RP=(CH modulo NbR)+1, and the predefined sequence indicating an intersecting column position in each selected row on the virtual keyboard to be selected by the user.

2. The method of claim 1, wherein the virtual keyboard is randomly generated.

3. The method of claim 1, wherein the virtual keyboard is displayed on a screen of the user computing machine.

4. The method of claim 1, wherein the user identification is entered on the virtual keyboard using a mouse.

5. The method of claim 1, wherein the user identification is entered on the virtual keyboard using scroll keys.

6. The method of claim 1, further comprising an initial phase of configuring the authentication routine for at least one user on the computing machine, the configuration phase comprising:
- customizing a layout of a virtual keyboard to determine a user arrangement of rows and columns;
- generating the mathematical formula reflecting a row arrangement of the customized virtual keyboard layout;
- defining the predefined sequence reflecting key assignments on columns of the customized virtual keyboard layout;
- combining the mathematical formula with the predefined sequence to generate a user secure information in a symbolic representation; and
- storing the symbolic representation of the user secure information.

7. The method of claim 1, wherein the user computing machine is coupled to a server of a computer system network, and wherein the secure user identification is stored in the server.

8. A computer system for performing a method for preventing illegitimate access to a user computing machine, the method comprising:
- setting an authentication routine in the user computing machine;
- generating, using the computer machine, a virtual keyboard on the user computing machine;
- entering a user identification through the virtual keyboard, the user identification being entered according to a virtual keyboard form factor;
- comparing, using the computer machine, the entered user identification with a secure user identification previously stored in the user computing machine; and
- validating, using the computer machine, the user access to the user computing machine if a match occurs, otherwise denying access;
- wherein the secure user identification is produced using a computation of a mathematical formula combined with a predefined sequence of a location of keys on the virtual keyboard, the mathematical formula indicating which row positions (RP) on the virtual keyboard are to be selected by the user, wherein the mathematical formula is based on a character (CH) and a number of rows (NbR) available on the virtual keyboard, wherein each selected row position (RP) is given by: RP=(CH modulo NbR)+1, and the predefined sequence indicating an intersecting column position in each selected row on the virtual keyboard to be selected by the user.

9. The system of claim 8, wherein the virtual keyboard is randomly generated.

10. The system of claim 8, wherein the virtual keyboard is displayed on a screen of the user computing machine.

11. The system of claim 8, wherein the user identification is entered on the virtual keyboard using a mouse.

12. The system of claim 8, wherein the user identification is entered on the virtual keyboard using scroll keys.

13. The system of claim 8, the method further comprising initially configuring the authentication routine for at least one user on the computing machine, the configuring comprising:
- customizing a layout of a virtual keyboard to determine a user arrangement of rows and columns;
- generating the mathematical formula reflecting a row arrangement of the customized virtual keyboard layout;
- defining the predefined sequence reflecting key assignments on columns of the customized virtual keyboard layout;
- combining the mathematical formula with the predefined sequence to generate a user secure information in a symbolic representation; and
- storing the symbolic representation of the user secure information.

14. The system of claim 8, wherein the user computing machine is coupled to a server of a computer system network, and wherein the secure user identification is stored in the server.

15. A computer program stored on a non-transitory computer readable medium, which when executed, prevents illegitimate access to a user computing machine, comprising program code for:
- setting an authentication routine in the user computing machine;
- generating a virtual keyboard on the user computing machine;
- entering a user identification through the virtual keyboard, the user identification being entered according to a virtual keyboard form factor;
- comparing the entered user identification with a secure user identification previously stored in the user computing machine; and
- validating the user access to the user computing machine if a match occurs, otherwise denying access;
- wherein the secure user identification is produced using a computation of a mathematical formula combined with a predefined sequence of a location of keys on the virtual keyboard, the mathematical formula indicating which row positions (RP) on the virtual keyboard are to be selected by the user, wherein the mathematical formula is based on a character (CH) and a number of rows (NbR) available on the virtual keyboard, wherein each selected row position (RP) is given by: RP=(CH modulo NbR)+1, and the predefined sequence indicating an intersecting column position in each selected row on the virtual keyboard to be selected by the user.

* * * * *